US008924473B2

United States Patent
Chalfin et al.

(10) Patent No.: US 8,924,473 B2
(45) Date of Patent: *Dec. 30, 2014

(54) APPLYING DIFFERENT TRANSPORT MECHANISMS FOR USER INTERFACE AND IMAGE PORTIONS OF A REMOTELY RENDERED IMAGE

(75) Inventors: Alexander Chalfin, Mountain View, CA (US); Alpana Kaulgud, Mountain View, CA (US); Mark Peercy, Cupertino, CA (US)

(73) Assignee: Silicon Graphics International Corp., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,223

(22) Filed: Sep. 14, 2012
(Under 37 CFR 1.47)

(65) Prior Publication Data

US 2013/0169650 A1    Jul. 4, 2013

Related U.S. Application Data

(63) Continuation of application No. 10/426,003, filed on Apr. 30, 2003, now Pat. No. 8,291,009.

(51) Int. Cl.
| | | |
|---|---|---|
| G06F 15/16 | (2006.01) | |
| G06T 15/40 | (2011.01) | |
| G06F 9/46 | (2006.01) | |
| H04L 29/06 | (2006.01) | |
| G06T 1/20 | (2006.01) | |
| G06T 15/00 | (2011.01) | |

(52) U.S. Cl.
CPC . *G06T 1/20* (2013.01); *H04L 69/16* (2013.01); *H04L 69/165* (2013.01); *G06T 2200/16* (2013.01); *G06T 15/00* (2013.01)

USPC ............ 709/203; 345/422; 345/427; 718/104

(58) Field of Classification Search
USPC .................... 709/203; 345/422, 427; 718/104
See application file for complete search history.

(56) References Cited

U.S. PATENT DOCUMENTS

| | | |
|---|---|---|
| 5,929,748 A | 7/1999 | Odinak |
| 6,131,121 A | 10/2000 | Mattaway et al. |

(Continued)

OTHER PUBLICATIONS

Chalfin, Advisory Action, U.S. Appl. No. 10/426,003, Mar. 12, 2009, 3 pgs.
Chalfin, Notice of Allowance, U.S. Appl. No. 10/426,003, Jun. 21, 2012, 7 pgs.

(Continued)

*Primary Examiner* — Asghar Bilgrami
(74) *Attorney, Agent, or Firm* — Lewis Roca Rothberger LLP (57) ABSTRACT

A system and method for remote rendering of computer graphics wherein user transactions are reliable and the transmission of rendered graphics is relatively fast. The invention is implemented in a client server context, where a computer graphics application and rendering resources are located at a server. A user controls the graphics application through a client machine connected to the server through a computer network. The user's commands are sent from the client to the server, while rendered computer graphics are transmitted from the server to a display at the client. Different transport protocols are used, depending on the requirements of a particular transmission. Data related to user interactions is transmitted using a relatively reliable transport protocol, such as TCP. Rendered subject graphics data is transmitted from the server to the client using a less reliable but faster transport protocol, such UDP.

18 Claims, 13 Drawing Sheets

(56) References Cited

U.S. PATENT DOCUMENTS

| | | | |
|---|---|---|---|
| 6,343,313 B1 | 1/2002 | Salesky et al. | |
| 6,442,603 B1 * | 8/2002 | Borella | 709/218 |
| RE38,078 E * | 4/2003 | Duluk, Jr. | 345/422 |
| 6,542,925 B2 | 4/2003 | Brown et al. | |
| 6,563,514 B1 | 5/2003 | Samar | |
| 6,578,068 B1 | 6/2003 | Bowman-Amuah | |
| 6,633,688 B1 | 10/2003 | Nixon et al. | |
| 6,711,622 B1 | 3/2004 | Fuller et al. | |
| 6,742,042 B1 | 5/2004 | Holden et al. | |
| 6,748,508 B1 | 6/2004 | Khandelwal et al. | |
| 6,775,785 B1 | 8/2004 | Hart et al. | |
| 6,909,432 B2 * | 6/2005 | Alcorn et al. | 345/506 |
| 7,139,417 B2 * | 11/2006 | Nicolas et al. | 382/131 |
| 8,291,009 B2 | 10/2012 | Chalfin et al. | |
| 2002/0093679 A1 | 7/2002 | Brady | |
| 2003/0122872 A1 | 7/2003 | Chiang et al. | |
| 2003/0164834 A1 * | 9/2003 | Lefebvre et al. | 345/506 |
| 2004/0139208 A1 | 7/2004 | Tuli | |
| 2006/0193012 A1 | 8/2006 | Wilkins et al. | |
| 2009/0172561 A1 * | 7/2009 | Driemeyer et al. | 715/744 |

OTHER PUBLICATIONS

Chalfin, Office Action, U.S. Appl. No. 10/426,003, Jul. 1, 2010, 12 pgs.

Chalfin, Office Action, U.S. Appl. No. 10/426,003, Jan. 6, 2009, 8 pgs.

Chalfin, Office Action, U.S. Appl. No. 10/426,003, Dec. 12, 2011, 11 pgs.

Chalfin, Office Action, U.S. Appl. No. 10/426,003, Mar. 16, 2011, 13 pgs.

Chalfin, Office Action, U.S. Appl. No. 10/426,003, Feb. 17, 2010, 11 pgs.

Chalfin, Office Action, U.S. Appl. No. 10/426,003, Jan. 17, 2007, 6 pgs.

Chalfin, Office Action, U.S. Appl. No. 10/426,003, Jul. 20, 2009, 11 pgs.

Chalfin, Office Action, U.S. Appl. No. 10/426,003, Apr. 21, 2008, 8 pgs.

Chalfin, Office Action, Chalfin, Office Action, US 10/426,003, Jul. 27, 2007, 9 pgs.

Richardson, The RFB Protocol, Jul. 2002, 34 pgs.

* cited by examiner

APPLYING DIFFERENT TRANSPORT MECHANISMS FOR USER INTERFACE AND IMAGE PORTIONS OF A REMOTELY RENDERED IMAGE

BACKGROUND OF THE INVENTION

CROSS-REFERENCE TO RELATED APPLICATIONS

This application is a continuation and claims the priority benefit of U.S. patent application Ser. No. 10/426,003, now U.S. Pat. No. 8,291,009, filed Apr. 30, 2003 which is incorporated by reference herein in its entirety.

RELATED ART

The design of any information processing system must typically face the requirements of speed and reliability. If large amounts of information are to be processed, fast processing and communications are required. For obvious reasons, reliable error free transactions are also a requirement. Obtaining both speed and reliability, however, can be difficult. Highly reliable systems often sacrifice throughput. Conversely, high speed systems may sacrifice reliability in order to achieve the desired levels of performance.

This trade-off can be seen in computer graphics systems. In particular, some computer graphic system architectures are implemented in a client server arrangement. Here, a graphics application and rendering resources operate at a server. A user, meanwhile, is located at a client and controls the graphics application remotely. User interface transactions need to take place in a reliable manner. User interface transactions are defined herein as rendering commands sent by a user to a graphics application, and rendered graphics data for a graphical user interface (GUI) sent from rendering resources at a server to the user's display. A user's commands must be conveyed to the server in an accurate fashion. From a user's perspective, such commands are given through a GUI, and can take the form of keyboard inputs, pointer inputs, such as those produced by a mouse or touchpad, or menu selections. The user also needs to receive accurate feedback from the server regarding the commands, via the GUI. Along with the image that is the subject of the graphics application (i.e., the subject graphics), an image of the GUI is also rendered at the server. Modified GUI images that show, for example, a depressed button or a highlighted menu selection must be reliably conveyed from the server back to the client.

The subject graphics, however, typically represents the bulk of the data being rendered. Throughput in rendering and transmitting rendered subject graphics to the client is therefore a priority, especially in the context of streaming graphics. A high data rate is therefore needed in transmitting the rendered subject graphics from the server to the client.

Hence there is a need for a system and method that provides both fast and reliable data transport in the context of a distributed computer graphics system, such that user interaction can take place reliably, while rendered graphics can be transported quickly.

SUMMARY OF THE INVENTION

The invention described herein represents a system and method for remote rendering of computer graphics wherein user transactions are reliable and the transmission of rendered graphics data is relatively fast. In one embodiment, the system of the invention is implemented in a client-server context, where a computer graphics application and rendering resources are located at a server. A user controls the graphics application through a client machine that is connected to the server through a computer network. The users commands are sent from the client to the server, while rendered computer graphics are transmitted from the server to an output device, such as a display at the client. Different transport protocols are used, depending on the requirements of a particular transmission. Data related to the user interface is transmitted using a relatively reliable transport protocol, such as the transmission control protocol (TCP). Rendered subject graphics data is transmitted from the server using a less reliable but faster transport protocol, such as the user datagram protocol (UDP).

Further embodiments, features, and advantages of the present invention, as well as the structure and operation of the various embodiments of the present invention, are described in detail below with reference to the accompanying drawings.

DETAILED DESCRIPTION OF THE INVENTION

I. Overview

The invention described herein represents a system and method for remote rendering of computer graphics wherein GUI-related transactions are transmitted reliably and the transmission of rendered graphics is relatively fast. The system of the invention is implemented in a client-server context, where a computer graphics application and rendering resources are located at a server. A user controls the graphics application through a client machine in communication with the server. The user's commands are sent from the client to the server, while rendered computer graphics are transmitted from the server to an output device such as a display at the client. One example of a remote graphics processing system in which the invention can be used is described in U.S. patent application Ser. No. 09/629,458, "System, Method, and Computer Program Product for Remote Graphics Processing," filed Jul. 31, 2000, and incorporated in its entirety by reference herein. Different transport protocols are used, depending on the requirements of a particular transmission. Data related to user interaction, such as rendering commands, are transmitted using a relatively reliable transport protocol, such as TCP. Rendered subject graphics data is transmitted from the server using a less reliable but faster transport protocol, such as UDP.

II. System

Figure 1:
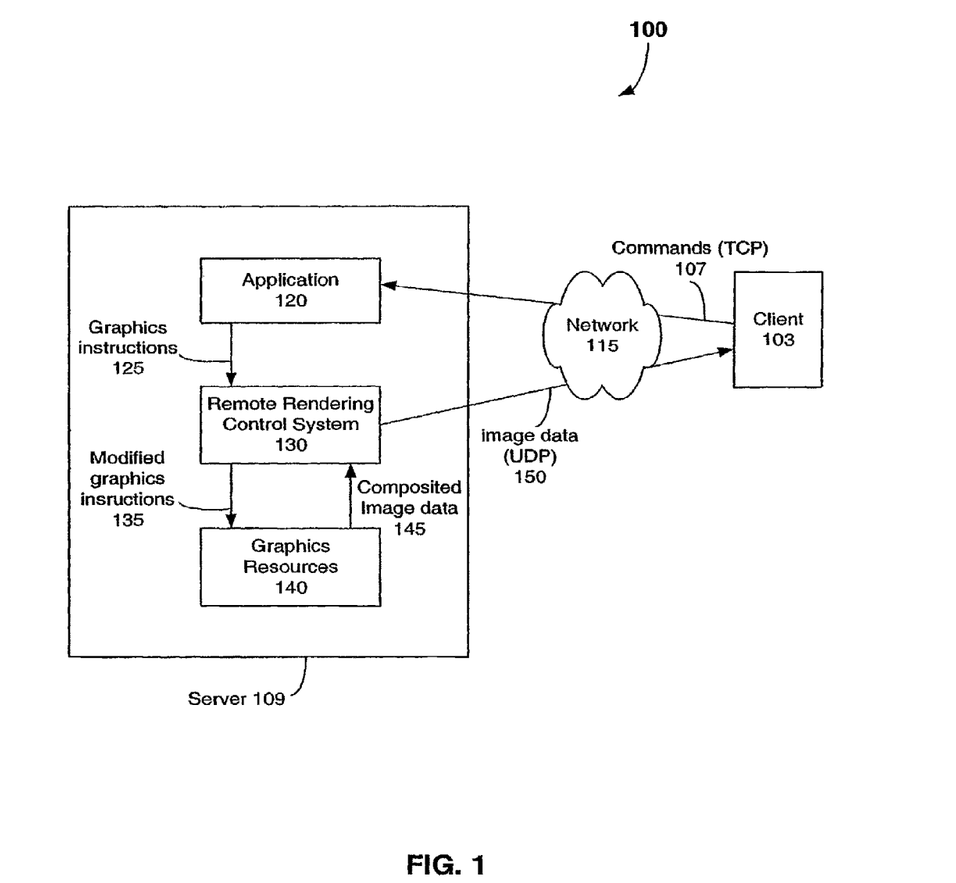
FIG. 1 is a block diagram illustrating an embodiment of the system of the invention.

The system of an embodiment of the invention is illustrated generally in FIG. 1. A client 103 is shown in communication with server 109. Communication takes place via network 115. Server 109 comprises a computer graphics application 120, a remote rendering control system 130, and graphics resources 140. Client 103, under the control of a user (not shown), issues rendering commands 107 to application 120. Commands 107 control the operation of application 120 and graphics resources 140. Because commands 107 must be communicated to application 120 accurately and reliably, commands 107 are sent using a relatively reliable transport protocol, such as TCP. Transport protocols are well known in the art. The data formatting and processing of TCP and other transport protocols are described by William Stallings, Data and Computer Communications, 2d edition, pp. 479-520, MacMillan Publishing Co., 1988, incorporated herein by reference in its entirety.

Given commands 107, application 120 sends graphics instructions 125 to remote rendering control system 130. Control system 130 then sends modified graphics instructions 135 to graphics resources 140. Graphics resources 140, which include one or more rendering pipelines (not shown) then create composited image data 145. Image data 145 includes both the rendered subject graphics data, and the rendered GUI graphics data. Data 145 is then processed further by control system 130 for purposes of transmission to client 103. Such processing can include, for example, data compression. The result is image data 150, which is sent to client 103 via network 115. Because a large volume of data is being transmitted to client 103, throughput of the transmission is a priority. For this reason, data 150 is transmitted using a relatively fast transport protocol, such as UDP. The data formatting and processing of UDP and other transport protocols are described by Stallings, id at pp. 518-519.

Note that in an alternative embodiment of the invention, image data 150 can be sent elsewhere, in addition to or instead of being sent to client 103. Image data can be sent to other nodes connected to network 115, for example, to allow viewing by parties other than the user.

Figure 2:
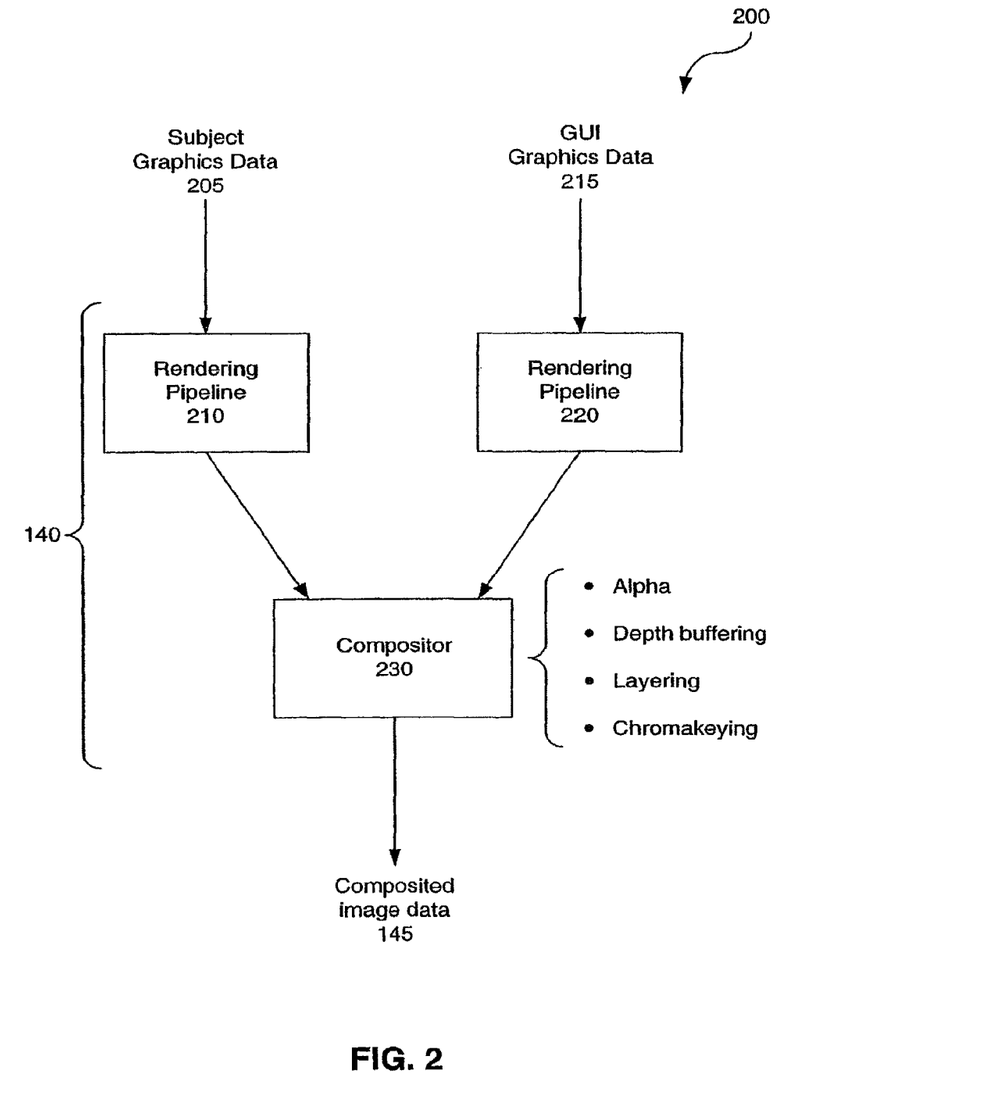
FIG. 2 is a block diagram showing the flow and processing of data through rendering resources located at a server, according to an embodiment of the invention.

The structure and operation of graphics resources 140 is shown in greater detail in FIG. 2. In the illustrated embodiment, graphics resources 140 comprise at least two rendering pipelines 210 and 220. The input to rendering pipeline 210 is subject graphics data 205. The input to rendering pipeline 220 is GUI graphics data 215. GUI graphics data 215 represents the graphical images associated with the GUI, as ultimately seen by the user. This would include window borders, controls, menus, and the like. The outputs of rendering pipelines 210 and 220 are then sent to compositor 230, which produces composited image 145. Compositor 230 can composite rendered subject graphics data and rendered GUI graphics data in a number of ways, as is well known in the art. Compositing can be performed on the basis of alpha values, for example, or performed by depth buffering. Additional methods of compositing include layering and chromakeying. As is known in the art, compositor 230 can be implemented in hardware, software, or a combination thereof.

Decoupling the rendering of GUI graphics and subject graphics in separate pipelines is described in greater detail in U.S. patent application Ser. No. 10/208,049, "System and Method for Decoupling the User Interface and Application Window in a Graphics Application," filed Jul. 31, 2002, and incorporated herein by reference in its entirety.

Figure 3:
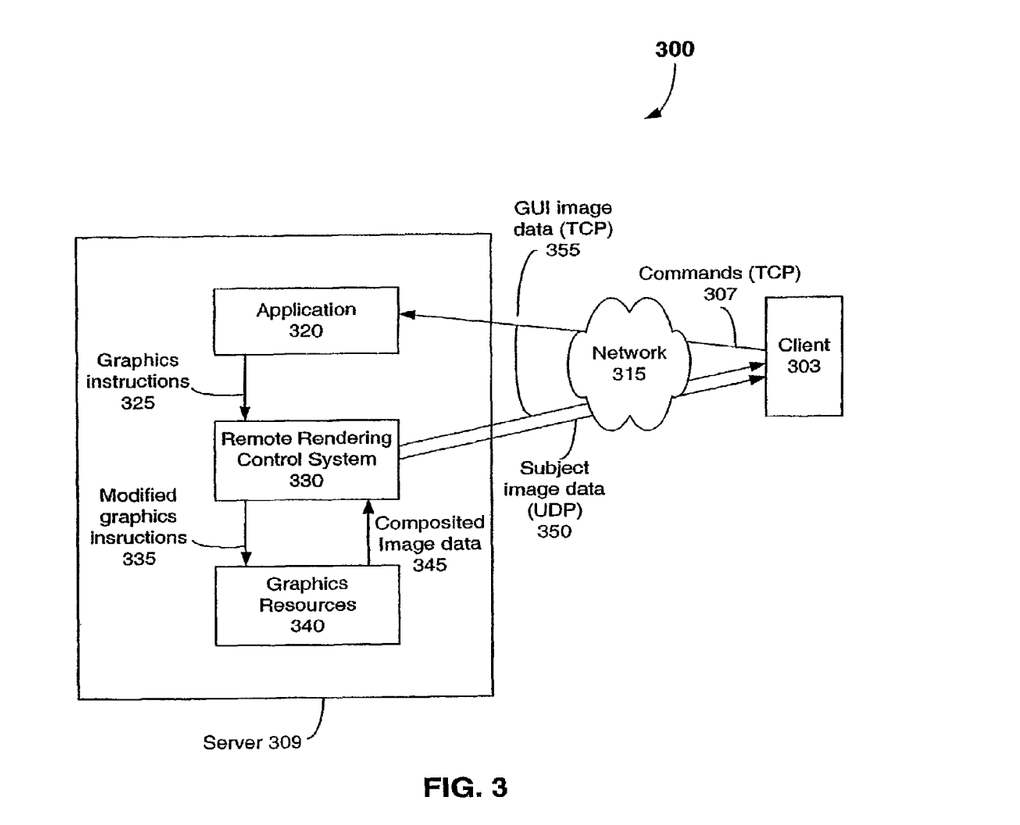
FIG. 3 is a block diagram illustrating the system of an alternative embodiment of the invention.

An alternative embodiment of the invention is illustrated in FIG. 3. A client 303 communicates with server 309 via network 315. Commands 307 are sent to computer graphics application 320 which executes on server 309. As before, commands 307 are transmitted using a reliable transport protocol, such as TCP. Application 320 sends graphics instructions 325 to a remote rendering control system 330. Control system 330 then sends modified graphics instructions 335 to graphics resources 340. As will be described below, in an embodiment of the invention, graphics resources 340 comprise two or more rendering pipelines. Rendered image data is then sent from graphics resources 340 to control system 330. Rendered graphics data is sent from server 309 to client 303 in two distinct components in this embodiment. Rendered subject graphics data 350 is sent to client 303 using a relatively fast transport protocol, such as UDP. Rendered image data associated with the GUI, rendered GUI graphics data 355, is sent separately. GUI image data 355 is sent using a more reliable transport protocol, such as TCP.

Figure 4:
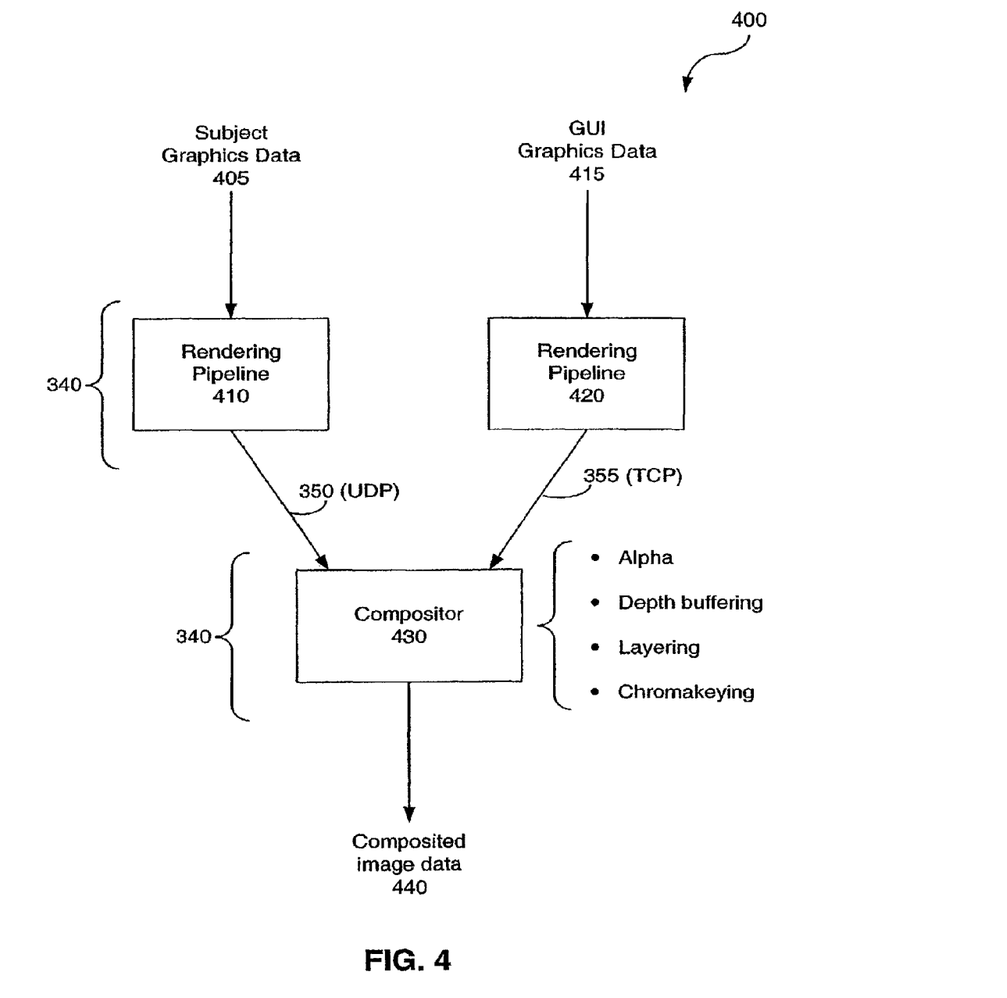
FIG. 4 is a block diagram illustrating data flow and processing in the embodiment of FIG. 3.

Additional detail for this embodiment is illustrated in FIG. 4. In this embodiment, graphic resources 340 comprise rendering pipelines 410 and 420. Subject graphics data 405 is input to rendering pipeline 410. GUI graphics data 415 is input to rendering pipeline 420. Compositor 430 is located at client 303 or at some location other than server 340. Compositor 430 receives rendered subject graphics data 350 from rendering pipeline 410. As described above, rendered subject graphics data 350 is transmitted to client 303 using a relatively high-throughput transport protocol, such as UDP. Compositor 430 also receives rendered GUI graphics data 355. Rendered GUI graphics data 355 is transmitted using a relatively reliable protocol, such as TCP. As described above with respect to FIG. 2, a compositor can perform its processing using any one of several compositing methods known to those of skill in the art. As is known in the art, compositor 430 can be implemented in hardware, software, or a combination thereof. The output of compositor 430 is composited image data 440.

Figure 5:
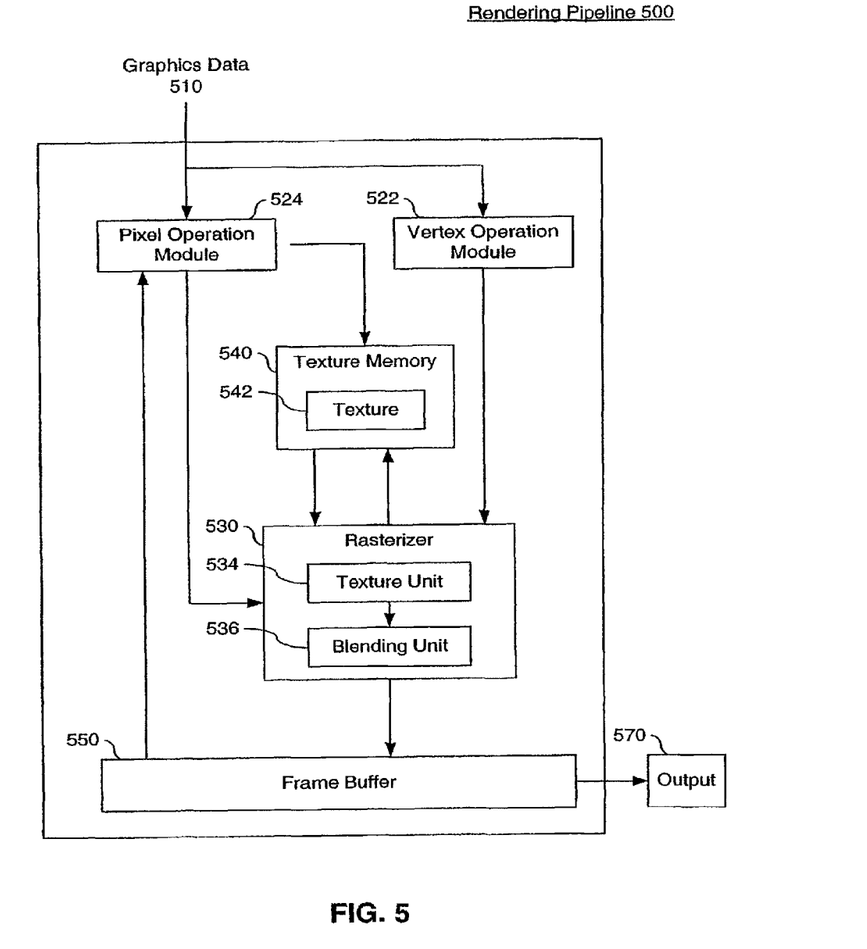
FIG. 5 is a block diagram illustrating an exemplary rendering pipeline.

In an embodiment of the invention, a rendering pipeline can be implemented as illustrated in FIG. 5. Rendering pipeline 500 is illustrative and not intended to limit the scope of the present invention. Other types of rendering pipelines can be used as would be apparent to a person skilled in the art, given this description. Therefore, while rendering pipelines can have the structure shown in FIG. 5, other embodiments of rendering pipelines can be used. Moreover, rendering pipelines in a given server need not be identical.

Rendering pipeline 500 comprises a vertex operation module 522, a pixel operation module 524, a rasterizer 530, a texture memory 540, and a frame buffer 550. Rendering pipeline receives graphics data 510, which is initially routed to vertex operation module 522 and a pixel operation module 524. Texture memory 540 can store one or more textures or images, such as texture 542. Texture memory 540 is connected to a texture unit 534 by a bus (not shown). Rasterizer 530 comprises texture unit 534 and a blending unit 536. Texture unit 534 and blending unit 536 can be implemented separately or together as part of a graphics processor. The operation of these features of rendering pipeline 500 would be known to a person skilled in the relevant art given the description herein.

In embodiments of the present invention, texture unit 534 can obtain either a point sample or a filtered texture sample from textures and/or images 542 stored in texture memory 540. Blending unit 536 blends texels and/or pixel values according to weighting values to produce a single texel or pixel. The output of texture unit 538 and/or blending unit 536 is stored in frame buffer 550. The contents of frame buffer 550 can then be read out as output 570.

The above embodiments of remote rendering systems take advantage of alternative methods for implementing the transport layer of a conventional protocol stack. The UDP transport protocol allows for faster transport of data compared to TCP, but can be less reliable than TCP. In contrast, TCP provides for greater reliability, at the cost of slower throughput when compared to other transport protocols such as UDP.

Figure 6:
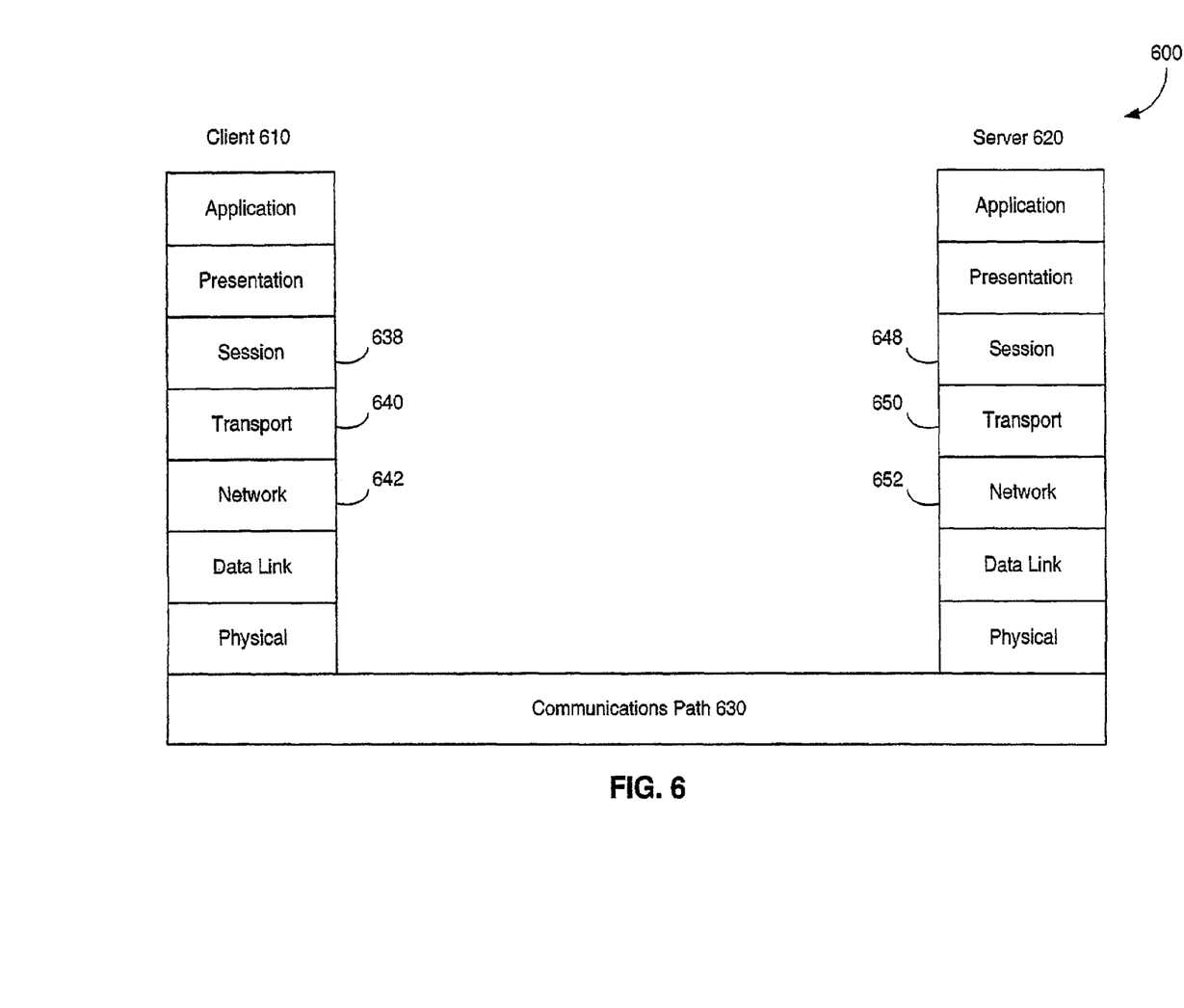
FIG. 6 illustrates a typical communications protocol between a client and a server.
Figure 7:
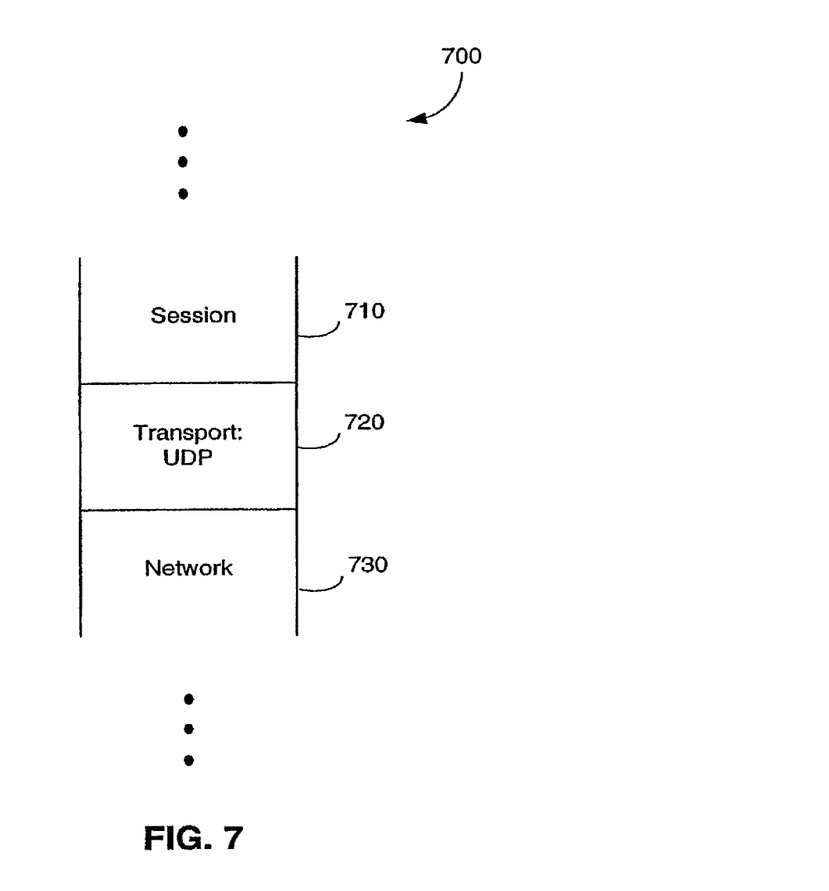
FIG. 7 illustrates the hierarchical context of the UDP transport protocol.
Figure 8:
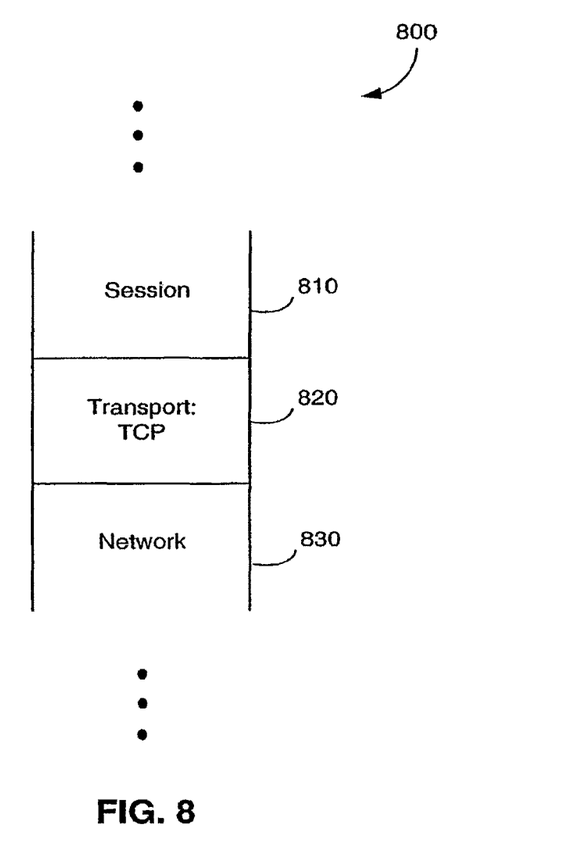
FIG. 8 illustrates the hierarchical context of the TCP transport protocol.

The context of a transport protocol in the conventional open systems interconnection (OSI) model is illustrated in FIG. 6. Given two entities that need to communicate, shown here as client 610 and server 620, the OSI model requires that the communications protocol of each party be implemented as seven layers. The protocol layers as implemented by client 610 include a transport protocol, implemented as layer 640 between session layer 638 and network layer 642. Analogously, server 620 implements transport layer 650 between session layer 648 and network layer 652. Ultimately, communications take place over path 630. FIG. 7 illustrates the use of a UDP transport protocol layer 720, shown here between a session protocol layer 710 and a network protocol layer 730. FIG. 8 illustrates the use of a TCP transport protocol layer 820 between a session layer 810 and a network layer 830.

III. Method

Figure 9:
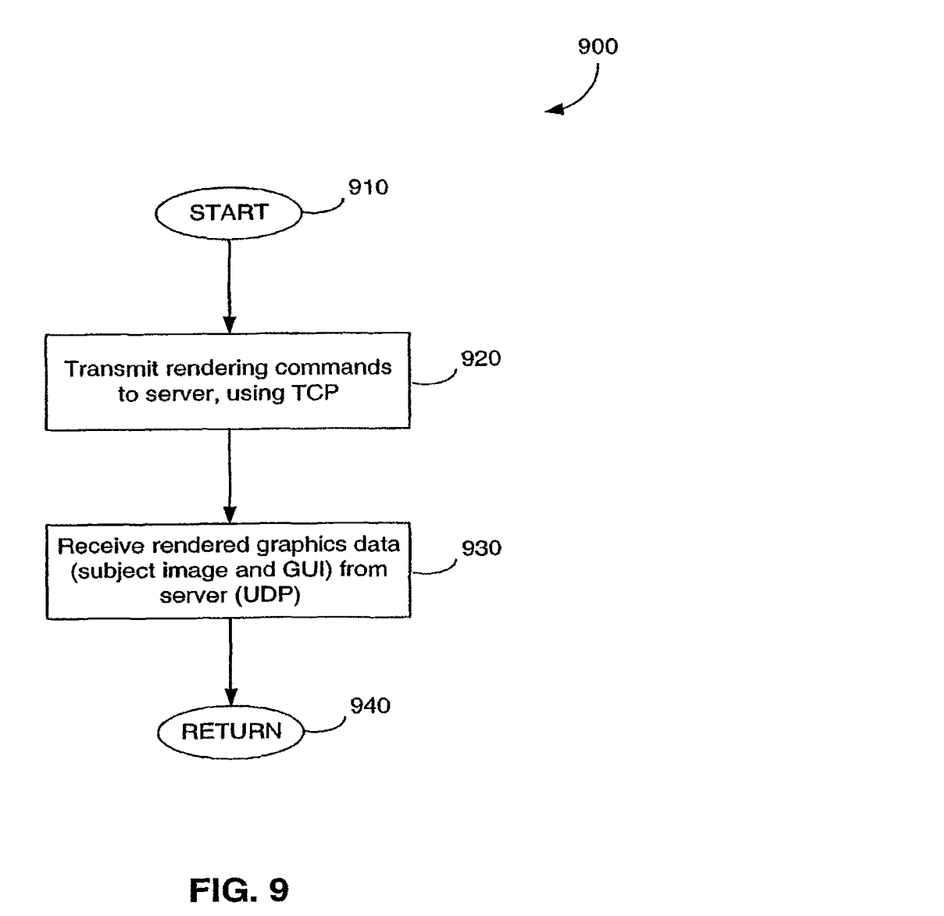
FIG. 9 is a flowchart illustrating the method of an embodiment of the invention from the perspective of a client.

A method of the invention, from the perspective of the client, is illustrated in FIG. 9. The process begins at step 910. In step 920, a server transmits rendering commands to the server, using the TCP transport protocol. In step 930, after graphics have been rendered by the server, the client receives rendered graphics data from the server using the UDP transport protocol. In the embodiment shown, the received rendered graphics data comprises both rendered subject graphics data and rendered GUI graphics data composited together. The process concludes at step 940.

Figure 10:
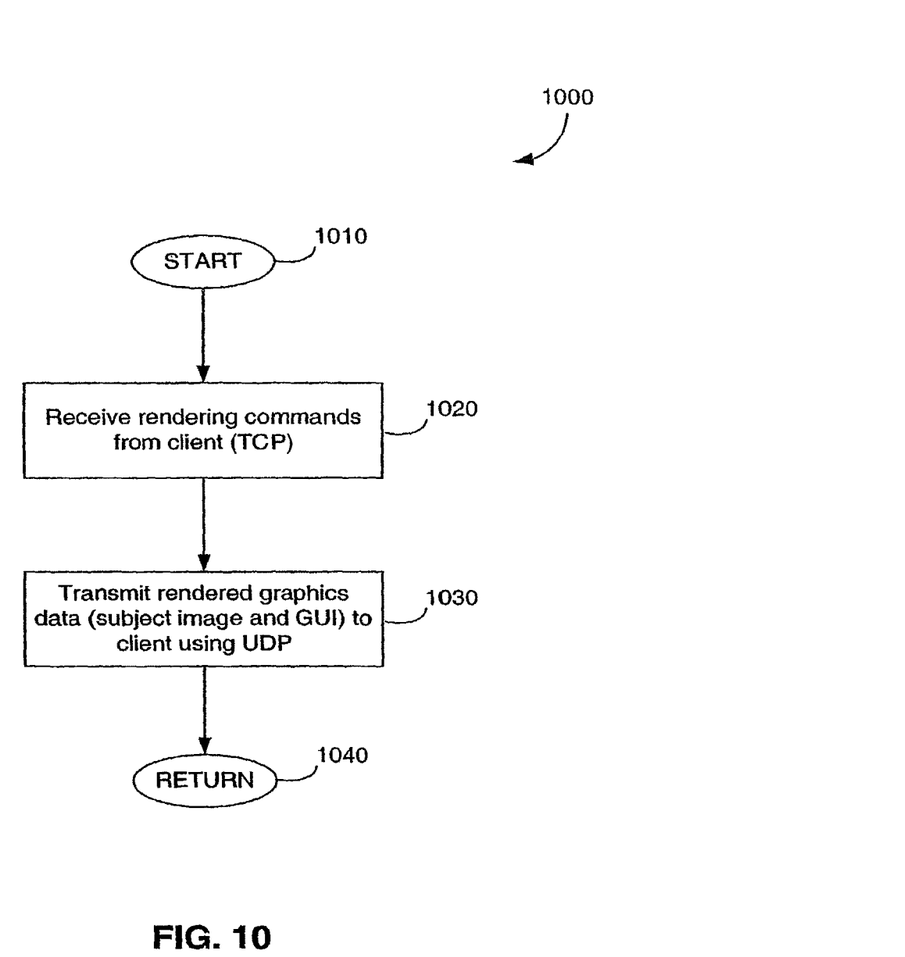
FIG. 10 is a flowchart illustrating the method of an embodiment of the invention from the perspective of a server.

The method of the invention from the perspective of the server is illustrated in FIG. 10. The process begins at step 1010. In step 1020, the server receives rendering commands from the client. These commands are transmitted using the TCP transport protocol. In step 1030, after rendering has been completed, rendered graphics data is transmitted to the client using the UDP transport protocol. The rendered graphics data includes rendered subject graphics data and rendered GUI graphics data that has been composited together.

Figure 11:
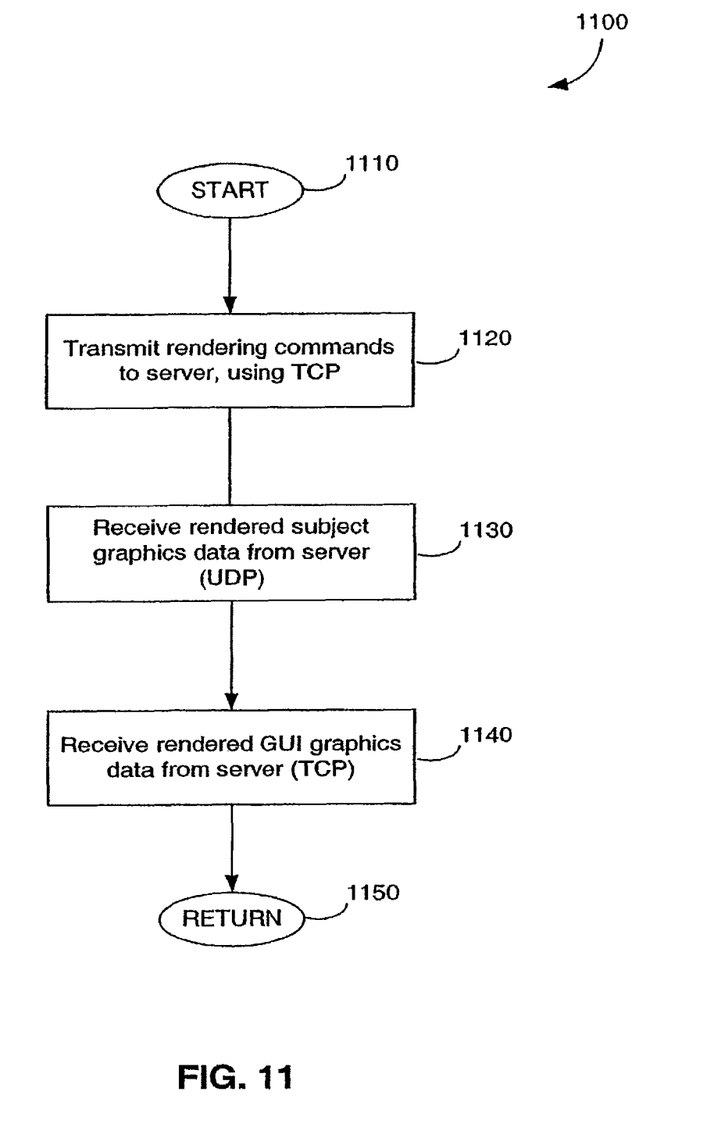
FIG. 11 is a flowchart illustrating the method of an alternative embodiment of the invention, from the perspective of the client.

The method of an alternative embodiment of the invention, from the perspective of the client, is illustrated in FIG. 11. The process begins at step 1110. In step 1120, the client transmits rendering commands to the server, using the TCP transport protocol. In step 1130, after the server has completed its rendering, the client receives rendered subject graphics data from the server, transmitted using the UDP transport protocol. In step 1140, the client receives rendered GUI graphics data from the server, transmitted using the TCP transport protocol. The process concludes at step 1150. Note that in alternative embodiments, steps 1130 and 1140 may take place in any order or may take place in parallel.

Figure 12:
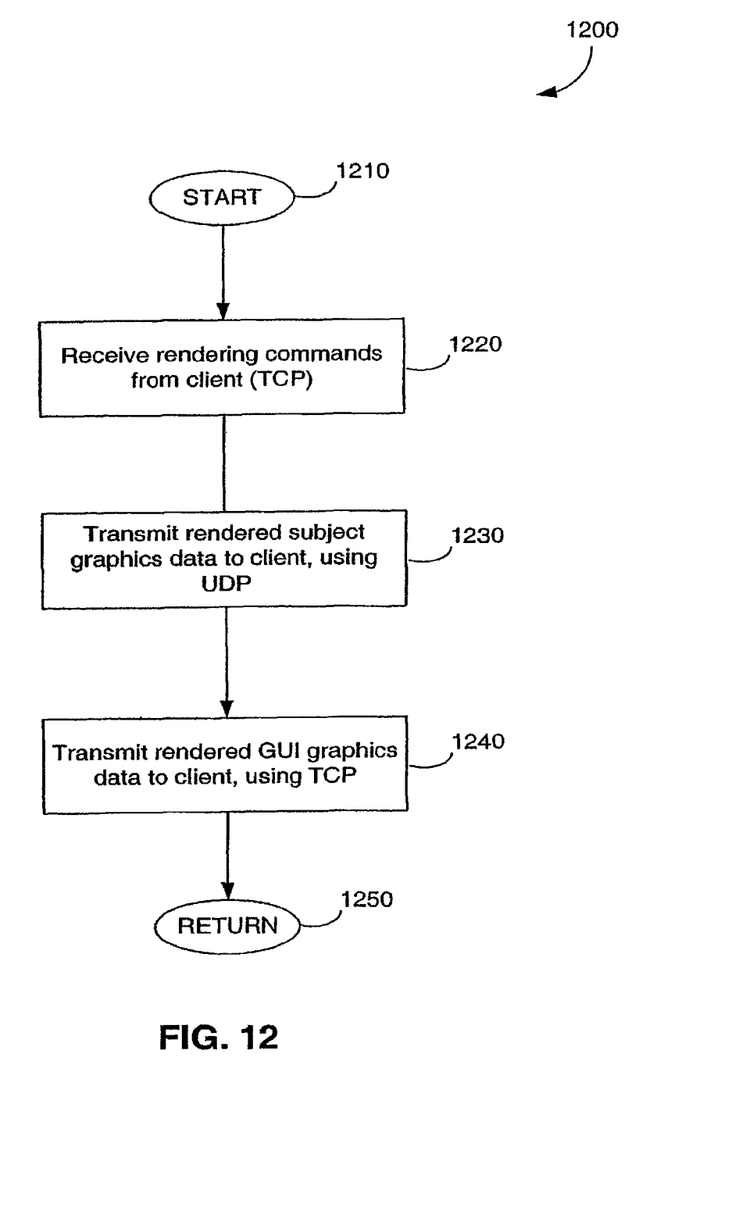
FIG. 12 is a flowchart illustrating the method of an alternative embodiment of the invention, from the perspective of a server.

The process of this embodiment of the invention, from the perspective of the server, is illustrated in FIG. 12. The process begins at step 1210. In step 1220, the server receives rendering commands from the client, sent using the TCP transport protocol. In step 1230, the server transmits rendered subject graphics data to the client using the UDP transport protocol. In step 1240, the server transmits rendered GUI graphics data to the client, using the TCP transport protocol. The process concludes at step 1250. In alternative embodiments of the invention, steps 1230 and 1240 may take place in any order, or may take place in parallel.

IV. Computing Environment

Both a client and a server represent computer systems. Logic that implements a transport protocol can be implemented as computer program code that executes on a computer system. An example of such a computer system 1300 is shown generally in FIG. 13. Computer system 1300 includes one or more processors, such as processor 1304. The processor 1304 is connected to a communication infrastructure 1306, such as a bus or network. After reading this description, it will become apparent to a person skilled in the relevant art how to implement the invention using other computer systems and/or computer architectures.

Figure 13:
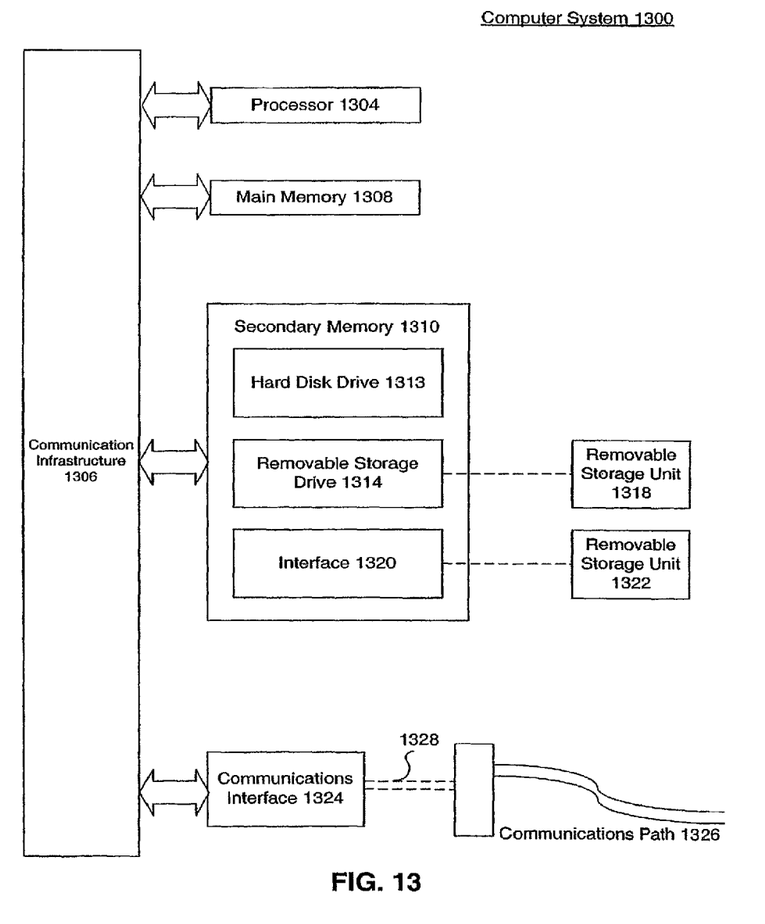
FIG. 13 is a block diagram illustrating the computing environment of the invention, according to an embodiment.

Computer system 1300 includes a main memory 1308, preferably random access memory (RAM), and may also include a secondary memory 1310. The secondary memory 1310 may include, for example, a hard disk drive 1312 and/or a removable storage drive 1314. The removable storage drive 1314 reads from and/or writes to a removable storage unit 1318 in a well known manner. Removable storage unit 1318—represents a floppy disk, magnetic tape, optical disk, or other storage medium which is read by and written to by removable storage drive 1314. The removable storage unit 1318 includes a computer usable storage medium having stored therein computer software and/or data.

In alternative implementations, secondary memory 1310 may include other means for allowing computer programs or other instructions to be loaded into computer system 1300. Such means may include, for example, a removable storage unit 1322 and an interface 1320. Examples of such means may include a removable memory chip (such as an EPROM, or PROM) and associated socket, and other removable storage units 1322 and interfaces 1320 which allow software and data to be transferred from the removable storage unit 1322 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a PCM-CIA slot and card, etc. Software and data transferred via communications interface 1324 are in the form of signals 1328 which may be electronic, electromagnetic, optical or other signals capable of being received by communications interface 1324. These signals 1328 are provided to communications interface 1324 via a communications path (i.e., channel) 1326. This channel 1326 carries signals 1328 and may be implemented using wire or cable, fiber optics, a phone line, a cellular phone link, an RF link and other communications channels. In an embodiment of the invention, signals 1328 at a client can comprise rendering commands that are to be processed for transmission using the TCP transport protocol, wherein this processing is performed at least in part by processor 1304 under software control.

Alternatively, signals 1328 at a client can comprise data received from a server, wherein the data includes rendered subject graphics data transmitted by the server using the UDP transport protocol and/or rendered GUI graphics data transmitted by the server using the TCP transport protocol. Here, processor 1304 processes the received signals 1328 for subsequent display.

At a server, signals 1328 can comprise rendering commands that have been transmitted by a client using the TCP transport protocol. Processor 1304 then processes received signals 1328 for use by the graphics application. At a server, signals 1328 can also comprise rendered subject graphics data that is to be processed by processor 1304 for transmission using the UDP transport protocol and/or rendered GUI graphics data to be processed for transmission with the TCP transport protocol.

In this document, the terms "computer program medium" and "computer usable medium" are used to generally refer to media such as removable storage units 1318 and 1322, a hard disk installed in hard disk drive 1312, and signals 1328. These computer program products are means for providing software to computer system 1300.

Computer programs (also called computer control logic) are stored in main memory 1308 and/or secondary memory 1310. Computer programs may also be received via communications interface 1324. Such computer programs, when executed, enable the computer system 1300 to implement the present invention as discussed herein. In particular, the computer programs, when executed, enable the processor 1304 to implement the present invention. Accordingly, such computer programs represent controllers of the computer system 1300. Where the invention is implemented using software, the software may be stored in a computer program product and loaded into computer system 1300 using removable storage drive 1314, hard drive 1312 or communications interface 1324.

V. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments.

What is claimed is:

1. A system for remote rendering of graphics data, the system comprising:
a server communicatively coupled to a remote client, the server including:
a plurality of rendering pipelines, wherein a first rendering pipeline of the plurality of rendering pipelines renders graphical user interface (GUI) graphics data, and a second rendering pipeline of the plurality of rendering pipelines renders subject graphics data, wherein the server receives a rendering command from the client, transmits the rendered subject graphics data using an unreliable transport protocol, and transmits the rendered graphical user interface (GUI) graphics data using a reliable transport protocol data to the client.

2. The system of claim 1, wherein the rendering command is communicated using a reliable transport protocol.

3. The system of claim 1, wherein the reliable transport protocol used to receive the rendering command is a TCP transport protocol.

4. The system of claim 1, wherein the reliable transport protocol used to transmit the graphical user interface (GUI) graphics data is TCP.

5. The system of claim 1, wherein the unreliable transport protocol is a UDP transport protocol.

6. A non-transitory computer-readable storage medium having embodied thereon a program executable by a processor to perform a method for rendering graphics data, the method comprising:
receiving a rendering command from a client;
rendering graphical user interface (GUI) graphics data in a first rendering pipeline;
rendering subject graphics data in a second rendering pipeline;
transmitting the rendered graphical user interface (GUI) graphics data using a reliable transport protocol; and
transmitting the rendered subject graphics data using an unreliable transport protocol.

7. The computer-readable storage medium of claim 6, wherein the rendering command is received using a reliable transport protocol.

8. The computer-readable storage medium of claim 7, wherein the reliable transport protocol used to receive the rendering command is a TCP transport protocol.

9. The computer-readable storage medium of claim 6, wherein the reliable transport protocol used to transmit the graphical user interface (GUI) graphics data is TCP.

10. The computer-readable storage medium of claim 6, wherein the unreliable transport protocol is a UDP transport protocol.

11. A method for remote rendering of graphics data, comprising:
receiving a rendering command from a client;
rendering graphical user interface (GUI) graphics data in a first rendering pipeline;
rendering subject graphics data in a second rendering pipeline;
transmitting the rendered graphical user interface (GUI) graphics data using a reliable transport protocol; and
transmitting the rendered subject graphics data using an unreliable transport protocol.

12. The method of claim 11, wherein the rendering command is received using a reliable transport protocol.

13. The method of claim 12, wherein the reliable transport protocol used to receive the rendering command is a TCP transport protocol.

14. The method of claim 11, wherein the reliable transport protocol used to transmit the graphical user interface (GUI) graphics data is TCP.

15. The method of claim 11, wherein the unreliable transport protocol is a UDP transport protocol.

16. The system of claim 1, further comprising:
a graphics processor;
a texture memory; and
a frame buffer, wherein the graphics processor obtains samples of at least one of a texture and an image stored in the texture memory when rendering the graphical user interface (GUI) graphics data and the subject graphics data, and wherein the graphics processor stores output from the graphics processor in the frame buffer.

17. The non-transitory computer-readable storage medium of claim 6, the program further executable to obtain at least one of a texture and an image when rendering the graphical user interface (GUI) graphics data, and when rendering the subject graphics data.

18. The method of claim 11, further comprising obtaining at least one of a texture and an image when rendering the graphical user interface (GUI) graphics data, and when rendering the subject graphics data.

\* \* \* \* \*